UNITED STATES PATENT OFFICE.

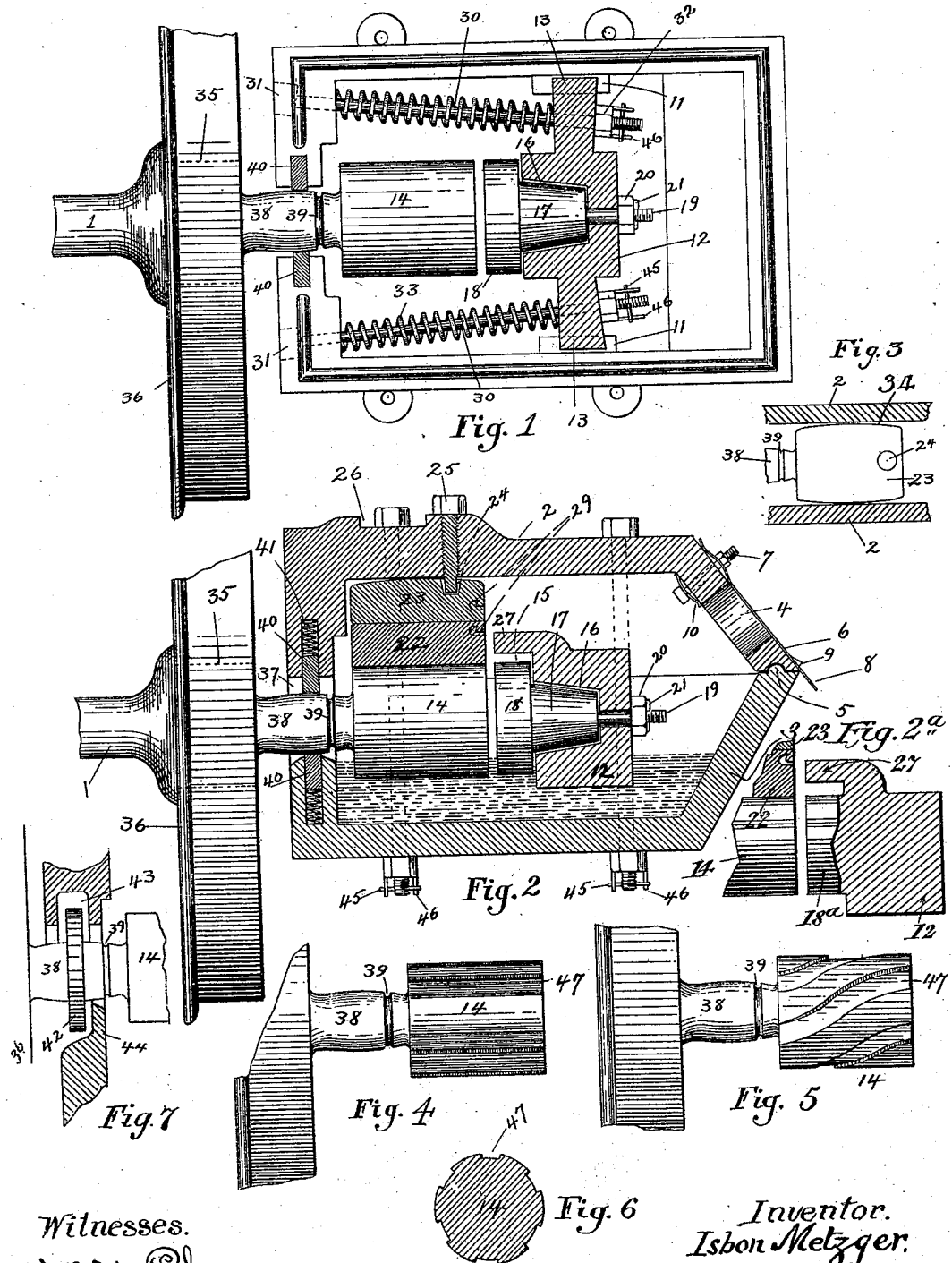

ISBON METZGER, OF LOUISA COUNTY, IOWA.

JOURNAL AND BEARING THEREFOR.

SPECIFICATION forming part of Letters Patent No. 543,187, dated July 23, 1895.

Application filed January 20, 1894. Serial No. 497,507. (No model.)

*To all whom it may concern:*

Be it known that I, ISBON METZGER, a citizen of the United States, residing in the county of Louisa, near Winfield, in the State of Iowa, have invented certain new and useful Improvements in Journals and Boxes or Bearings Therefor, of which the following is a full, clear, and exact specification.

My invention relates to improvements in the journals of axles or shafting and the boxing or bearings therefor; and it is more particularly designed as an improvement on the invention covered by United States Letters Patent No. 511,445, granted to me December 26, 1893, to which reference may be had for an understanding of features common to both devices not fully described herein.

One of the objects of my present invention is to do away with the part called the "bridge" M, employed in my former invention, and thus simplify and cheapen the construction.

Another object of my invention is to provide a cushion for the abutment for limiting the end-thrust of the axle or journal, whereby it may be adjusted toward the journal or axle and at the same time will be held securely in the position to which it is adjusted.

Another object of my invention is to provide for vertical oscillation of the shaft or axle independently of the box and yet have the bushings or bearings bear squarely upon the journal from end to end during such oscillation.

Another object of my invention is to provide for the oscillation of the bushings or bearings in a horizontal plane—that is, on a vertical axis independently of the boxing—whereby such bushings will remain squarely on the journal during the lateral oscillation of such journal independently of the boxing, which often occurs with car-axle journals when rounding curves.

Another object of my invention is to provide improved means for arresting leakage of oil or lubricant where the axle passes through the boxing; and a still further object of my invention is to reduce the wearing-surface of the journal without reducing its diameter or its length.

With these ends in view my invention consists in certain features of novelty hereinafter more fully described, with reference to the accompanying drawings, and more particularly pointed out in the claims.

In the said drawings, Figure 1 is a plan view of my improved journal and box, the cap or cover of the box being removed and certain parts being shown in section. Fig. 2 is a vertical longitudinal section of the same. Fig. 2ª is a detail view of a modified form of abutment. Fig. 3 is a view drawn to a smaller scale, looking down on the bushing or bearing, showing the rounded edges of the same for permitting lateral twisting or oscillation. Fig. 4 is a detail view of a modified form of journal. Fig. 5 is a similar view of a still further modification. Fig. 6 is a cross-section of the journal in Fig. 4, and Fig. 7 is a modified form of dust-guard.

Like signs of reference indicate like parts throughout the several views.

My improvements are shown in the drawings as applied to a car-axle 1, but it will nevertheless be understood that I do not limit myself to this particular application of the invention and that the same may be applied to shafting or any other form of revoluble axles.

The usual axle-box, which is preferably formed in two sections, an upper one 2 and a lower one 3, is provided at one end with an opening 4 for the admission of oil or lubricant to the interior of the box, the lower section of which is of sufficient depth to contain a supply of oil into which the journal and other parts dip, as will be hereinafter described, and the edges of the two sections being provided with tongue-and-groove joint 5 for preventing leakage of oil between the two parts. The opening 4 is closed by a door or valve 6, which is preferably constructed of a thin sheet pivoted by the bolt 7 to the end of the box and being secured in place over the opening 4 by an extension 8, which engages between the two lugs or ears 9, so that by lifting the extension 8 out of engagement with such ears 9 the door may be turned from side to side for uncovering the opening 4, if desired, a spring 10 being interposed between the head of the bolt 7 and the inner side of the box 2 for holding the door or valve firmly in place and at the same time permitting of its described movements.

Formed on the inner walls of the box, preferably on the lower section 3, are two guideways 11, which support and upon which slide a follower 12, having extensions 13 engaging with such guideways. This follower 12 is arranged adjacent to and preferably directly opposite the end of the journal 14, and it is provided with an abutment 18 for limiting the end-thrust of such journal as the axle moves to and fro endwise, independently of the box, or vice versa. This abutment, for the sake of reducing the friction to a minimum, is made revoluble with the journal. To this end the follower 12 is provided with a socket 16, which is preferably conical, as shown, and in this socket is arranged the conical end 17 of the revoluble abutment 18, the outer end of the abutment being provided with an enlarged head or flange, as shown, which dips into the oil in the box and carries it upward, so that it will run down over the upper side of the conical end 17 and thus keep this part freely lubricated. A further object of the conical shape of the end 17 is to take up lost motion resulting from the reduction of the surfaces by wear, the parts being so proportioned that the end 17 will have a bearing both at the inner end of the socket 16 and on its sides, while the inner face of the enlarged head or flange of the abutment will bear against the face of the follower. In this way the parts will wear away equally and retain their described bearings.

If desired, the abutment for limiting the end-thrust of the axle or journal may be formed in one piece or rigidly with the follower, as shown at 18ª in Fig. 2ª.

The revoluble abutment may be held in place in the socket of the follower by means of a stem 19, formed on or otherwise secured to the portion 17, and projecting through a suitable opening in the follower and being provided with a nut 20, bearing against the back of the follower and being held against displacement by an ordinary pin 21, passing through the stem 19.

Interposed between the upper side of the journal 14 and the under side of the top of the box are the usual bearing blocks or bushings 22 23, the upper one of which is provided with an enlarged socket 24, in which engages the end of a lug formed by an ordinary screw-bolt 25 passing through the top of the box, the bolt 25 being arranged to one side of the seat 26, which is provided for the usual spring. (Not shown.) This bolt 25 holds the block 23 against displacement, while at the same time the enlarged socket 24 permits the block 23 a slight freedom of movement in all directions. The lower block or bushing 22 is held against displacement by an overhanging projection 27, formed on the upper side of the follower 12, the projection 27 and the abutment carried by the follower being normally located at a slight distance from the end of the journal and the block 22, so as to permit the two latter a slight freedom of movement lengthwise of the axle and thus avoid undue friction.

When it is desired to remove the blocks 22 23 for replacing them with new ones, the bolt 25 is withdrawn until its end no longer engages in the socket 24, whereupon the block 23 may be drawn out over the projection 27, through the door 4 at the end of the box, the ends of the blocks 22 23 being provided with sockets 29 for the insertion of any suitable hook for this purpose. This having been done, the block or bushing 22 may be lifted above the projection 27 and drawn out in a similar manner without removing the follower 12 or altering its adjustment.

The follower 12 is held up to its work by means of two rods 30, having heads 31, as a convenient means of securing them to the inner end of the box. The inner ends of the rods pass through suitable openings in the projection 13 of the follower and are threaded and carry nuts 32, by which the follower may be forced toward the journal. In order, however, that the follower may be held in the position in which it is adjusted and not vibrate against the end of the journal, I interpose a cushion between the follower and the inner end or some other convenient part of the box. As a convenient way of accomplishing this, I provide each of the rods 30 with a coil spring 33, sleeved thereon, as clearly shown in Fig 1.

In rounding curves the axle undergoes a torsional strain or oscillation in a horizontal plane, such movement taking place independently of the boxing and consequently causing the bushings or bearings to bear unevenly upon the journal. In order that this lateral movement of the axle may take place without disturbing the bearings or bushings with reference to the journal, the blocks or bearings 22 23 are rounded on their side edges, as shown at 34 in plan in Fig. 3, so that they may oscillate or twist on a vertical axis within the box without losing perfect contact with the journal.

The axle or shaft 1 is provided with an enlarged shoulder 35, upon which the car-wheel 36 or the pulley or other element to be driven by the shaft or axle is keyed. The journal 14 is of enlarged diameter, so as to dip down into the oil in the box 3 below the opening 37 in the box through which the axle passes, and between this enlarged shoulder 35 and the journal 14 the axle is provided with a reduced portion 38, which may be approximately the same in thickness as the main part of the axle. This reduced portion 38 is beveled or tapered outwardly on the exterior of the box, so that any sand or grit falling upon it will have a tendency to work toward the wheel and not into the box, and within the box this reduced portion is tapered inwardly or toward the journal 14, so that the oil climbing up upon the journal 14 and running down onto the portion 38 will not have a tendency to run out, but will leak back into the box. In order, however, that this inwardly-tapering of the inner end of the portion 38 may not assist the oil on the under side of such portion in running toward the opening in the box, I provide the portion 38, at a point within the box, with a peripheral groove 39, which serves the two-fold purpose of catching oil in its course toward the opening in the box and causing it to again drop down into the oil receptacle, and, further, in arresting the progress of any grit or sand that might find its way past the glands 40 into the box, the same being caught by the groove and washed out by the oil, so that it falls to the bottom of the oil-receptacle and does not come in contact with the journal 14. To the end also that the oil may be further guarded from escaping through the opening 37 the inner edges of such opening are beveled inwardly, so that oil splashing up onto them will again run back into the box.

The glands 40 may be of the usual or any suitable construction having semicircular openings for the passage of the portion 38, which they hug and against which they are firmly pressed by the springs 41. Instead of the glands 40, however, the reduced portion 38 may be formed with a flange 42, as shown in Fig. 7, about equal in diameter to the journal 14 and having its upper half working in the socket 43, in which the gland 40 is ordinarily arranged. The lower section of the box, however, instead of being provided with a socket like the socket 43, is cut away on the outside immediately under the flange 42, while on the inside is provided a wall or projection 44, which may be constituted by the end of the box. Thus it will be seen that dust and grit will be precluded from entering the box over the top of the flange 42 by the outer side of this inclosing-socket 43, while any dirt and dust lodging upon the portion 38 or upon or against the flange 42 will drop off and fall clear of the box when the revolution of the axle brings the same to the under side. The socket 43 for the reception of the flange 42 may be made of sufficient size to permit of the requisite end-play of the axle without injury to the parts.

It will be understood that the journal 14 is slightly less in diameter than the shoulder 35, so that in putting the wheel in place on such shoulder it may be readily passed over the journal.

Any of the nuts which are apt to work loose may, if desired, be conveniently locked against retrograde movement by means of pins 45, one of which passes through a perforation in each of the screw rods or bolts and engages with two lugs 46 formed on or otherwise secured to the nuts.

In order that the wearing-surface of the journal 14 may not be unduly increased by reason of its enlarged diameter I may, if desired, provide the surface of such journal with grooves or channels 47 extending in the direction of its length. These grooves or channels may be strictly parallel with the axle or journal, as shown in Fig. 4, but for the sake of making the bearing-surface of the journal approximately continuous throughout its periphery they are preferably formed in a spiral direction, as shown in Fig. 5, so that the ribs formed by the grooves will rotate in a more or less endwise direction, and will consequently lessen the friction or cutting tendency that might result from the arrangement of the ribs shown in Fig. 4. These ribs have a further useful function in catching the oil as they pass through it and conveying the same to the surface of the bushing or block 22.

While I have been particular to describe minutely the details of construction of my invention, it will nevertheless be understood that the same may be modified or varied at will without departing from the spirit of my invention, and I therefore do not limit myself to the same.

Having thus described my invention, what I claim as new therein, and desire to secure by Letters Patent, is—

1. The combination with an axle or journal and a box therefor, of an adjustable follower having an abutment for limiting the end thrust of said axle or journal, and a cushion acting to hold said follower away from said axle or journal, substantially as set forth.

2. The combination with an axle or journal and a box therefor, of a bushing in said box, a rigid adjustable follower, and a revoluble abutment carried by said follower for limiting the end thrust of said axle or journal, said follower being provided with a projection for holding said bushing in place, substantially as set forth.

3. The combination with an axle or journal and a box therefor, of a follower arranged in said box and having an abutment for limiting the end thrust of said axle or journal, screw rods for adjusting said follower and springs arranged on said rods for holding said follower away from the axle or journal, substantially as set forth.

4. The combination with an axle or journal and a box therefor, of a bodily movable follower having an abutment arranged opposite the end of said journal for limiting its end thrust, springs for holding said follower and abutment normally away from said journal, and means for forcing said follower toward said journal, substantially as set forth.

5. The combination with an axle or journal and a box therefor, of a bodily movable follower having an abutment arranged opposite the end of said journal, screw rods passing through the end of said box and said follower and having nuts thereon and springs coiled on said rods between the end of said box and said follower and holding the said abutment normally away from the said journal, substantially as set forth.

6. The combination with an axle or journal and a box therefor, of a bushing arranged in said box over said journal, an adjustable follower having an abutment arranged opposite the end of said journal and being provided with a projection extending over the said abutment toward but not touching the said bushing for arresting end movement of the latter, substantially as set forth.

ISBON METZGER.

Witnesses:
 F. A. HOPKINS,
 EDNA B. JOHNSON.